Patented Nov. 20, 1928.

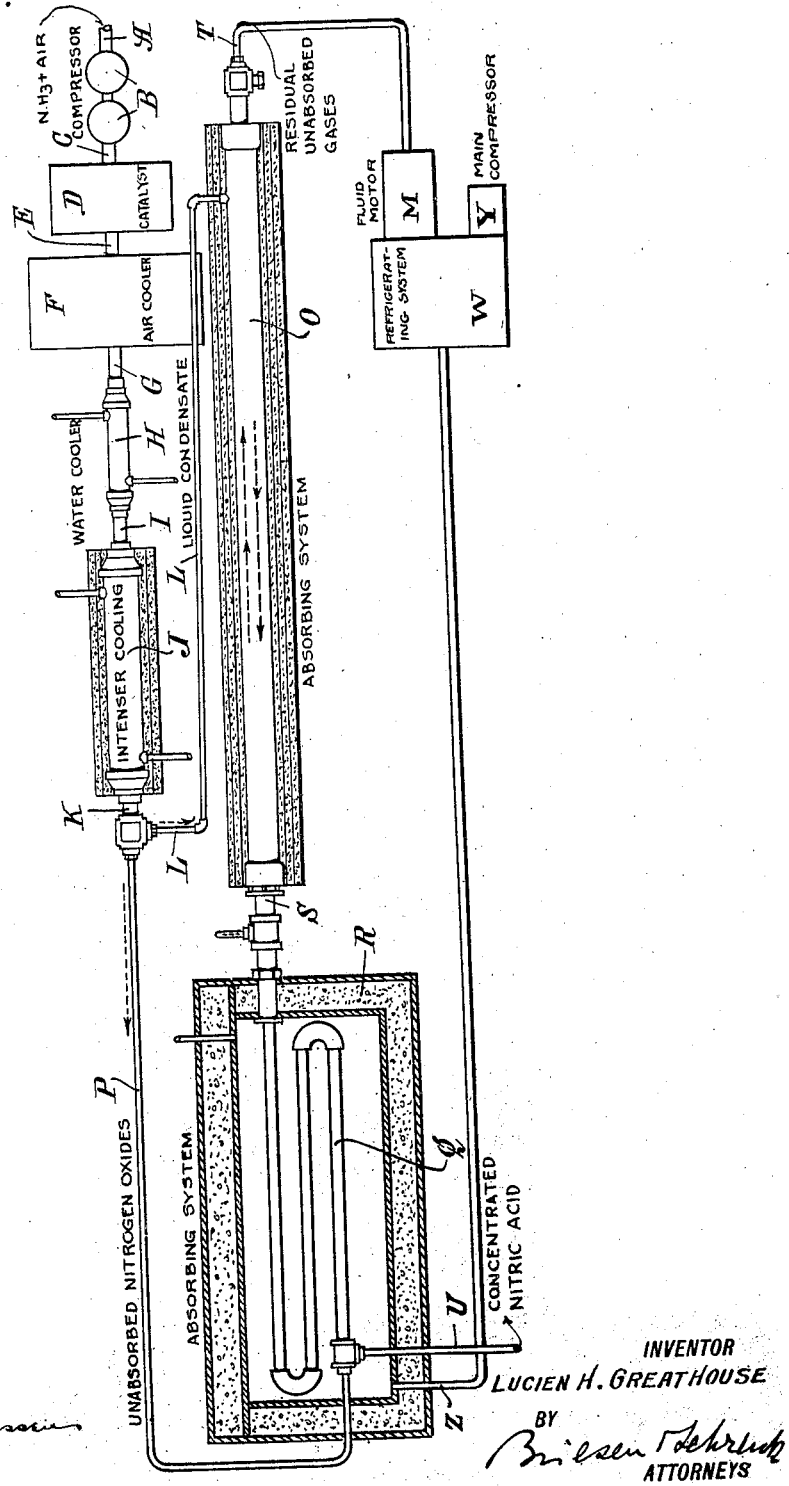

1,692,298

UNITED STATES PATENT OFFICE.

LUCIEN H. GREATHOUSE, OF CLARENDON, VIRGINIA, ASSIGNOR TO ATMOSPHERIC NITROGEN CORPORATION, OF SYRACUSE, NEW YORK, A CORPORATION OF NEW YORK.

PRODUCTION OF NITRIC ACID FROM AMMONIA.

Application filed September 6, 1923. Serial No. 661,151.

This invention relates to the production of nitric acid, and particularly concentrated nitric acid, from ammonia.

Catalytic action has been employed heretofore to obtain nitrogen oxides from ammonia in the presence of oxygen, but the problem of converting these nitrogen oxides directly into nitric acid, and particularly concentrated nitric acid and therefore into a commercially valuable and useful product still lacked satisfactory solution, so far as I am aware, prior to my present invention. The usual method of absorbing the nitric acid gases in water not only necessitates numerous large and expensive absorption towers, together with acid-proof pipe lines, etc., but produced an acid of only about 50% $HNO_3$, which therefore must be subjected to a concentration process before the desired concentrated nitric acid results.

The transformation of nitrogen oxides into nitric acid by absorption in water is known to proceed most satisfactorily under increased pressure, increased oxygen concentration and decreased temperature, but attempts made hitherto to take advantage of such conditions in the case of ammonia oxidation products have not led to practical results, owing to certain difficulties encountered. For instance, direct compression of the dilute and moist nitrogen oxide mixture is not practicable because of the strong corrosive action which these nitrogen oxide gases, when moist, have on any pump. Removal of moisture prior to compression, by employing refrigeration to separate the nitrogen oxides as liquids, requires excessive and costly refrigeration, and even then the removal of the nitrogen oxides from the gas is never complete. When only decreased temperature is employed, or only increased oxygen concentration, the large expensive tower absorption apparatus is still necessary, and the results, while beneficial, are not commensurate with the increased cost.

I have by my present invention provided a way of overcoming all the difficulties mentioned above and obtaining the desired nitric acid, particularly in concentrated form, directly from the gaseous reaction product containing nitrogen oxides, without the use of the customary large absorption towers. For this purpose, the said gaseous product or mixture is itself produced under pressure and then subjected to regulated cooling, that is to say, the catalytic oxidation of the ammonia is carried out under pressure and the resulting compressed gaseous product containing nitrogen oxides is then subjected to graduated cooling without releasing the pressure. Nor is it necessary to supply additional air or water (or water vapor) to the compressed mixture, i. e. the water resulting from the catalytic oxidation of the ammonia and the oxygen content of the original ammonia-air mixture are sufficient for the transformation of the nitrogen oxides to concentrated nitric acid of 60–70% strength. In special cases, however, addition of water or air (oxygen) may be desirable and such procedure is within the scope of the invention.

Without desiring to limit myself to the details described and shown, I will now set forth a typical example of my invention with the aid of the accompanying drawing, which is a diagrammatic elevation of a plant suitable for the purpose of my invention, parts of the apparatus being shown in section.

In said drawing, A indicates a pipe through which the original gaseous mixture containing ammonia and air is supplied to a compressor B of any suitable construction. If the ammonia is already under pressure as might be the case when synthetic (liquid) ammonia is used, it would only be necessary to compress the air. From the outlet of the compressor the compressed mixture passes through a pipe C to a catalytic chamber or oxidizer D containing platinum or other suitable catalyzers. From the outlet of the oxidizer D the mixture passes through a pipe E to a cooler F cooled by air, and then through a pipe to a cooler H cooled by water, a jacket for water circulation being indicated in the drawing. Through a pipe I, the products then pass to another cooler J, cooled by brine or otherwise, from which they pass out through a pipe K. As will be explained below, partial condensation and absorption take place in the coolers H and J, and the liquid condensate together with the gaseous remainder travel in contact with each other and in the same direction until they reach the outlet pipe K. Here a separation of liquid from gas is effected, the liquid condensate passing through a pipe L to a cooler O (cooled with brine or other suitable agent), near one end thereof. This cooler O may be slightly inclined toward the cooler R to facilitate the flow of the liquid through cooler O. The gaseous portion of the product is taken from the pipe K through a pipe P to one end of a coil Q located in a cooler R (cooled for instance, by brine), the other end of said coil being connected by a pipe S with the end of the cooler O opposite to the one at which the liquid condensate is introduced through the pipe L. At the other end of the cooler O there is a gas outlet T, while a liquid outlet U is provided at the bottom of the coil Q, both outlets T and U being controlled, for instance, by needle valves or spring-pressed valves of a well-known type constructed to open only at a pressure slightly higher than the one it is desired to maintain in the entire apparatus from the compressor outlet C to the gas and liquid outlets T and U respectively. It will be understood that these parts of the apparatus are closed to the outside air, and built to withstand the intended pressure.

The operation is preferably conducted as follows:

A gaseous mixture of ammonia and air containing from 8 to 10 per cent of ammonia (by volume) is compressed (in B), for instance, to 60 lbs. per square inch gage pressure and at this pressure is catalyzed in the oxidizer D at a temperature of from 800 to 900° centigrade. The product of this catalytic oxidation is a mixture of various oxides of nitrogen. Performing this oxidation step under pressure not only produces a nitrogen oxide gas which is already compressed to the point best suited for the subsequent absorption but also increases the output of nitrogen oxides per unit of catalyst space and per unit of time. About 90% of the ammonia is converted into nitrogen oxides.

The hot gaseous reaction product, without release of pressure, is first cooled moderately by air in the cooler F and then cooled to a lower temperature by water circulating in the jacket of the cooler H. From 75 to 90% of the water content is condensed in the cooler H, forming with the condensed nitrogen oxides, weak nitric acid of about 20% $HNO_3$. This liquid condensate and the remaining gaseous constituents then pass to the cooler J, in which the temperature is further reduced, say to about 0° centigrade. The condensation is thereby carried to such a point as to furnish at the outlet K, nitric acid of from 50 to 55% $HNO_3$, such acid representing the condensation of from 60 to 70% of the nitrogen oxides produced in the catalyzer D.

It will be noted that on their way to the outlet K, both the liquid condensate and the uncondensed gases travel in the same direction, and in contact with each other. After leaving the cooler J, however, the liquid condensate and the gaseous constituents follow, for a time, different paths, to be then brought into renewed contact, but during this second contact the condensate and the gases travel in opposite directions, to obtain more efficient absorption. The liquid condensate is taken from the outlet K through the pipe L to the cooler or absorber O, which is cooled to about $-10°$ C. The uncondensed gases are taken from the outlet K through the pipe P to the cooling coil Q which constitutes the second or final absorber, such gases entering this absorber near the liquid outlet U. In the absorption path formed by the coil Q, pipe S and cooler or first absorber O, the gases and the liquid condensate travel in contact with each other, but in opposite directions, the liquid passing first through O, then through S, and finally through Q, to be discharged at the outlet U, while the gases enter into Q near U, as stated, and then travel successively through Q, S and O to finally pass out at T. The final absorber Q is cooled to a temperature of about $-10°$ centigrade or lower. The liquid condensate is strengthened in $HNO_3$ by absorption progressively as it passes through the first absorber O and through the second or final absorber Q, the product delivered at the outlet U being concentrated nitric acid containing from 60 to 70% of $HNO_3$.

While the process may be carried out without adding air (or oxygen) at any stage of the absorption if sufficient oxygen is present in the original mixture (and generally this is the case), the addition of air (or oxygen) at any stage of the absorption may be resorted to if the original mixture does not contain enough oxygen, or if it is desired to still further promote the formation of nitric acid. When it is not desired to produce acid of the maximum strength (from 60 to 70%) water may be added at any suitable stage of the process. Under certain circumstances, it may also be advisable to carry out the several condensation steps at two or more different pressures, which pressure will be less than the initial pressure at which the ammonia is oxidized. In all cases, however, the pressure within the apparatus will be above atmospheric pressure.

Much of the energy used for compression may be recovered by using the expansion of the spent or exit gas, leaving at T, for refrigeration, as for example by allowing the exit gas to expand in a fluid motor M operating in conjunction with the refrigerating system W and its main compressor Y to provide the refrigerant introduced at Z. The refrigeration so obtained as the result of using the expansion of the spent gas from T in the fluid motor M will in turn determine to some extent the most economic temperature for the absorbers or condensers Q and O. Various modification may be made without departing from the nature of my invention as set forth in the appended claims.

I claim:

1. The process which consists in compressing a gaseous mixture containing ammonia and oxygen and subjecting the compressed gaseous mixture to catalytic oxidation cooling the resulting product so as to cause a portion thereof to become condensed to liquid form, causing such liquid condensate and the uncondensed gases to travel in contact with each other in the same direction while further cooling them, then separating the liquid condensate from the uncondensed gases, then bringing such liquid condensate and uncondensed gases into renewed contact with each other and causing them to travel in contact with each other in opposite directions while further cooling them, and finally discharging separately, the liquid nitric acid thus obtained and the remaining uncondensed gases, the entire process being conducted at a pressure above atmospheric pressure.

2. The process which consists in compressing a gaseous mixture containing ammonia and oxygen and subjecting the compressed mixture to catalytic oxidation, cooling the resulting product first by the action of air and then by the action of water, so as to cause a portion of said product to become condensed to liquid form, causing such liquid condensate and the uncondensed gases to travel in contact with each other in the same direction while further cooling them to a temperature in the neighborhood of 0° centigrade, then separating the liquid condensate from the uncondensed gases, thereupon bringing such liquid condensate and uncondensed gases into renewed contact with each other and causing the condensate to travel in the opposite direction to the said uncondensed gases and in contact therewith while cooling to a temperature in the neighborhood of −10° centigrade, and finally discharging the liquid nitric acid thus obtained and the remaining uncondensed gases, the entire process being conducted at a pressure above atmospheric pressure.

3. The process of making nitric acid which consists in oxidizing ammonia in the presence of a suitable catalyst, said operation being conducted at above atmospheric pressure and thereupon without release of pressure: (a) causing the condensate and unabsorbed gases to travel in contact with each other in the same direction while cooling; (b) separating the condensate from the uncondensed gases and (c) bringing the condensate and the uncondensed gases into renewed contact and causing them to travel in contact with each other in opposite directions while further cooling; (d) withdrawing the resultant liquid.

4. The process of producing concentrated nitric acid, which consists in oxidizing ammonia in the presence of a suitable catalyst, condensing and cooling the readily liquefiable portions of the reaction product, bringing the uncondensed gaseous portion of the reaction product and the cold condensed portions into contact with each other favorable to the absorption of nitrogen-compound constituents of the gaseous portion by the condensed portions, and carrying out the whole of the aforesaid process from the oxidation step to the end of the absorption step continuously at above atmospheric pressure.

5. The process of producing concentrated nitric acid which consists in oxidizing ammonia in the presence of a suitable catalyst, condensing and cooling the readily liquefiable portions of the reaction product, bringing the uncondensed gaseous portion and the cold condensed portions of the reaction product into contact with each other favorable to the absorption of nitrogen-compound constituents of the gaseous portion by the condensed portions, and carrying out the whole of the aforesaid process from the oxidation step to the end of the absorption step continuously under pressure of about sixty pounds gauge per square inch.

6. The process of producing concentrated nitric acid by catalytically oxidizing ammonia, cooling the gaseous reaction product to about room temperature and then absorbing residual nitrogen oxides in the condensate so produced while carrying out the whole of said process continuously at above atmospheric pressure.

7. The process of producing concentrated nitric acid by catalytically oxidizing ammonia, and then cooling the gaseous reaction product in stages, and bringing the unabsorbed and uncondensed gas of the last stage in contact with the condensate from the previous stage while carrying out the whole of said process continuously at above atmospheric pressure.

8. The process of producing concentrated nitric acid by catalytically oxidizing ammonia, then cooling the gaseous reaction product in stages and bringing the unabsorbed and uncondensed gas of the last stage in contact with the condensate from the previous stage under conditions favorable to the absorption of nitrogen-compound constituents of the uncondensed portion by the said condensate and maintaining uncombined oxygen in the gas in all the said stages, while carrying out the whole of said process continuously at above atmospheric pressure.

9. The process of producing concentrated nitric acid by catalytically oxidizing ammonia and subjecting the gaseous reaction product to regulated cooling while maintaining contact between the uncondensed and unabsorbed portion and the condensate favorable to the absorption of nitrogen-compound constituents of the uncondensed portion by the said condensate, and carrying out the whole of said process continuously at above atmospheric pressure.

10. The process of producing concentrated nitric acid by catalytically oxidizing ammonia and then subjecting the gaseous reaction product to regulated cooling while maintaining contact between the uncondensed and unabsorbed portion and the condensate favorable to the absorption of nitrogen-compound constituents of the uncondensed portion by the said condensate and utilizing the energy of expansion of the unabsorbed final gaseous residue for cooling; the whole of the operations being carried out continuously at above atmospheric pressure.

In testimony whereof I have hereunto set my hand.

LUCIEN H. GREATHOUSE.